UNITED STATES PATENT OFFICE.

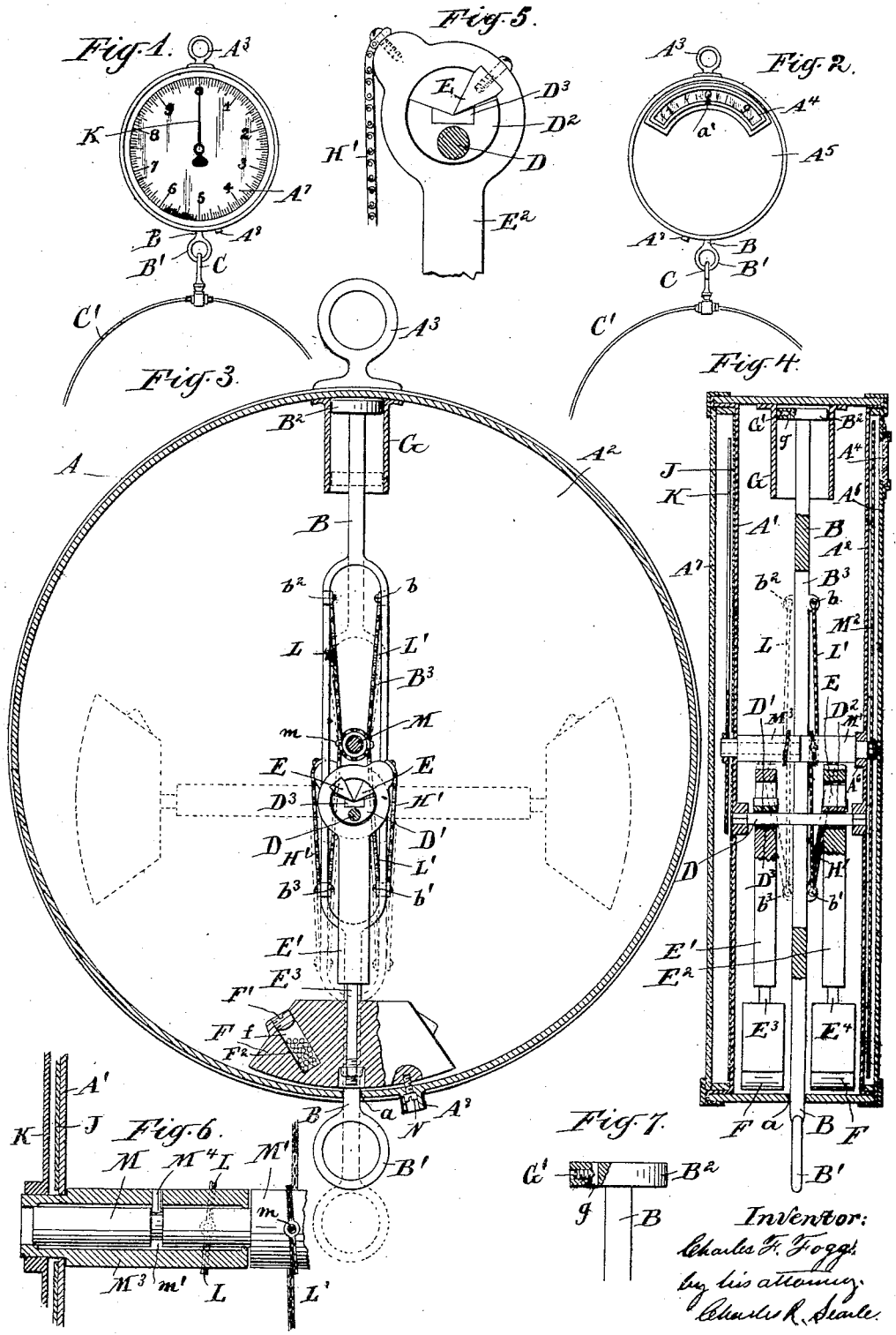

CHARLES F. FOGG, OF NEW YORK, N. Y.

WEIGHING-SCALE.

1,270,508.  Specification of Letters Patent.  Patented June 25, 1918.

Application filed March 29, 1916. Serial No. 87,502.

*To all whom it may concern:*

Be it known that I, CHARLES F. FOGG, a citizen of the United States, residing in the city of New York, borough of Manhattan, in the county and State of New York, have invented a certain new and useful Improvement in Weighing-Scales, of which the following is a specification.

The main object of the invention is to provide a scale resembling in appearance the convenient spring scale now generally employed, but in which the counterbalancing is effected by weights instead of the spring, thus insuring uniformity and accuracy in the weighing operations by eliminating the variability and inaccuracies of the spring balance.

Another important object is to provide means for indicating the weight on both faces of the casing, and means for permitting the scale to be accurately adjusted; and, generally, to provide a scale in which the mechanism shall be simple, and easily and economically constructed and assembled, and which shall be durable and uniformly accurate.

The invention consists in certain novel features of construction and arrangement by which the above objects are attained, to be hereinafter described and claimed.

The accompanying drawings form a part of this specification and show an approved form of the invention.

Figure 1 is a front elevation of the improved scale and a portion of the suspended pan.

Fig. 2 is a corresponding rear elevation.

Fig. 3 is a front elevation, on a larger scale, showing the mechanism within the casing, the latter and certain other portions being shown in vertical section.

Fig. 4 is a corresponding vertical transverse section, partly in elevation.

Fig. 5 is an elevation showing in detail the weight supporting means, partly in vertical section, and on a still larger scale.

Fig. 6 is an elevation, partly in vertical section, showing the index mechanism.

Fig. 7 is an elevation partly in vertical section showing a portion of the cushioning device and an adjusting means therefor.

Similar letters of reference indicate the same parts in all the figures.

The casing, shown as circular in form, comprises a narrow cylinder or hoop having a cover-plate $A^1$ for the front face and a cover-plate $A^2$ for the rear, forming with the hoop A a fixed frame for the inclosed mechanism. At the top of the hoop or band A is an eye or loop $A^3$ by which the scale is suspended for service, and an eye $B^1$ on a rod B extending through an opening $a$ at the lower face of the hoop receives a hook C on the bail $C^1$ of a pan or platform, not shown, on which is supported the article to be weighed.

D is a bar rigidly supported by its squared ends in oppositely located bosses on the cover-plates, or otherwise, parallel with and a short distance below the axial line of the casing. It carries two separated partial hubs $D^1$ $D^2$ fixed thereon and having the upper face of each inclined inwardly to form an obtuse angle or flattened V, and each hub is equipped with a bearing-block $D^3$ of agate or other hard material similarly shaped with its angle at the exact center of the circle described by the periphery of its segmental hub. On each hub is mounted a lever, marked $E^1$ $E^2$ respectively, each having a head in which is a circular opening matching the periphery of its hub, and free to oscillate or rotate partially thereon supported by a wedge-shaped arm E of hardened steel set angularly within the opening and having a knife-edge lying in the angle of its agate block, serving as a fulcrum for its lever. The arms E E are located oppositely to each other and the levers swing or diverge oppositely as will be described.

The levers $E^1$ $E^2$ extend perpendicularly downward and terminate in screwthreaded rods $E^3$ $E^4$ extending through weights F F and suspending the latter by means of nuts on the lower ends of the rods so that each lever and its weight is in effect a pendulum supported on its knife-edge E.

The rod B on which the pan, not shown, is hung, extends vertically of the casing, its upper end equipped with a piston or plunger $B^2$ received in a cylinder G mounted on the inner face of the hoop A with its lower end open. The plunger and cylinder serve, with the opening $a$ below, to guide the rod vertically and also to provide an air-cushion or dashpot for checking violent vertical movements. The rod stands between the levers and weights and its central portion is in the form of a long closed loop or slot $B^3$ through which the bar D passes without interfering with the movements of the rod.

On the head of each lever, opposite to its arm E, is attached a flexible connection, as the chains $H^1$ $H^1$, secured at the lower end to the rod B so that a downward pull on the rod, as caused by the weight of an article in the pan, will be transferred through the chains $H^1$ $H^2$ respectively to the levers $E^1$ $E^2$ and tend to swing them outwardly in opposite directions, resisted by the gravity of the weights F F, which latter will move to a position angularly, and permit the rod to descend to an extent, required to counterbalance the weight of the article, the range being determined by the rising movements of the weights F F from the perpendicular line passing through the fulcrums of the levers, to a horizontal line passing through the same center and in which position the weights exert their greatest force.

The weight of the article may be indicated in a variety of ways through the descent of the rod; the preferred means is by an index in relation to a graduated circular dial or scale, and in the form shown the front of the casing carries such a dial marked J, and a hand or index K is moved relatively thereto, while on the rear face of the casing is a window $A^4$ in the disk $A^5$ exterior to the cover-plate $A^2$, through which the figures and graduations on a rotating dial may be read.

M is a shaft mounted axially of the casing and having at the rear end an enlargement or drum $M^1$. The rear end of the shaft extends through a boss $A^6$ on the rear cover-plate $A^2$, serving as a bearing, and is squared to receive the circular dial $M^2$ secured thereto exterior to the cover-plate and between the latter and the disk $A^5$ which forms the rear face of the casing. The dial $M^2$ is graduated on its margin and the figures and graduations are read through the window $A^4$ in the disk $A^5$, relatively to a fixed indicating mark $a^1$ on such window.

Motion is imparted to the shaft and dial by a chain $L^1$ or like flexible means, attached to rod B at the point $b$ above the shaft, carried once around the drum $M^1$ and the other end secured to the rod B at the point $b^1$ below the shaft. The chain is pinned to the drum at $m$. Each rising or sinking movement of the rod correspondingly rotates the drum and shows the weight of the article at the window $A^4$. The chain is wound upon the drum in the direction to turn the dial from left to right at the window during the downward movement of the rod.

The front end of the shaft M is inclosed in a cylindrical sleeve $M^3$ free to rotate on the shaft and having a diameter the same as the drum $M^1$. It is held in position by the engagement of a pin $M^4$ on the sleeve in an annular groove $m^1$ in the shaft.

The sleeve is reduced at the front and extends through the front cover-plate $A^1$ and fixed dial J mounted thereon, and carries an index or pointer K by which the weight is indicated relatively to the figures and graduations on the fixed dial J.

Motion is imparted to the sleeve $M^3$ by a chain L attached to the rod B above the shaft M at the point $b^2$, carried once around the sleeve, in the direction opposite to that of the chain $L^1$, and the lower end fastened to the rod B at a point $b^3$ below the shaft.

Thus arranged the pointer or index K also swings to the right on the descent of the rod, and the sleeve rotates on the shaft in the direction opposite to that of the drum $M^1$. The pointer and fixed dial are protected by a glass plate $A^7$ forming the front face of the casing.

In order to increase or diminish slightly the gravity of the weights F in adjusting the scale, a cavity $f$ is formed in each, closed by a screw-plug $F^1$ and adapted to contain a greater or lesser quantity of shot $F^2$ or other material which may be easily added or subtracted as found necessary.

$A^8$ $A^8$ are tubular bosses on the lower face of the hoop A, in each of which is a screw N adapted to enter a corresponding hole in the adjacent weights F and thus hold them securely against oscillatory movements while the scale is being transported.

Suitable means are provided for controlling the vertical movements of the rod, governed by the corresponding movements of the plunger $B^2$ in the cylinder G; those shown comprise a channel $g$ through the plunger, and a radially mounted screw $G^1$ in the latter by which the channel may be restricted and the flow of air therethrough correspondingly reduced to prevent violent oscillations of the weights F.

The drum $M^1$ may be continuous from end to end of the shaft M and a single chain, as L, employed to impart the desired rotatory motion to the dial $M^2$ at the rear and the pointer K at the front, in such case the dial will move from right to left at the window $A^4$ and the numbers and graduations will be changed accordingly in the reverse of the arrangement shown in Fig. 2.

Instead of the movable dial $M^2$ at the rear, a fixed dial may be employed, similar to the dial J at the front, and a pointer substituted for such movable dial, and covered by a glass plate as will be understood, thus making both faces alike.

Other modifications may be made in the forms and proportions in adapting the invention to various uses and conditions of service. A single weighted lever may be employed; but the double arrangement shown is preferable for the reason the equal divergence of the two levers in opposite directions counterbalance each other and insure the maintenance of the scale in a vertical position when suspended by the eye A³.

I claim:—

1. A casing, a rod extending diametrically within the same and mounted to move vertically therein and adapted to support an article to be weighed, a pair of weighted levers fulcrumed in said casing and on a common fulcrum connected to said rod to swing in opposite directions and to be raised in opposition to the weight of such article, means operatively connected with said rod for indicating the weight of such article, a cylinder in said casing, a plunger carried on said rod and movable in said cylinder to prevent violent movements of said rod, and weights, and means for varying the yielding resistance of said cylinder and plunger to such movements.

2. A casing, a rod mounted to move vertically therein and adapted to support an article to be weighed, a pair of levers fulcrumed in said casing and connected to said rod to swing in opposite directions and to be raised in opposition to the weight of such article, weights adjustably mounted on said levers, means operatively connected with said rod for indicating the weight of such article, said weights having cavities therein adapted to contain material to be added to or taken from said weights to vary their amount.

3. A casing, a rod mounted to move vertically therein and adapted to support an article to be weighed, means within said casing for guiding said rod at its opposite ends, a pair of levers fulcrumed in said casing, and connected on a common fulcrum to said rod to swing in opposite directions and to be raised in opposition to the weight of such article, weights adjustably mounted on said levers, means operatively connected with said rod for indicating the weight of such article, and means on said casing for engaging and holding said weights and levers against movement relatively to said casing.

4. A casing, a bar fixed therein, a pair of segmental hubs thereon having their upper faces inclined inwardly to form an angle, a lever for each hub having a circular opening therein matching to and inclosing such hub, an arm in each of such openings having a knife-edge received in such angle, a rod movable vertically in said casing between said levers and having a slot through which said bar passes, a weight on each of said levers, connections from said rod to said levers to swing the latter in opposite directions by movements of said rod, means on said rod for supporting an article to be weighed, and means actuated by the movements of said rod for indicating the weight of such article.

5. A casing, a rod movable vertically therein, having a slot and adapted to support an article to be weighed, a bar extending transversely of said casing through such slot, two weighted levers fulcrumed on said bar on opposite sides of said rod, connections from said levers to said rod and arranged to swing said levers in opposite directions by movements of said rod, a shaft extending transversely of said casing and through such slot, a drum on said shaft, flexible connections from said rod to said drum for rotating said drum and shaft through movements of said rod, and means operated by said shaft for indicating the weight of such article.

6. A casing, a rod movable vertically therein, having a slot and adapted to support an article to be weighed, a bar extending transversely of said casing through such slot, two weighted levers fulcrumed on said bar on opposite sides of said rod, connections from said levers to said rod and arranged to swing said levers in opposite directions by movements of said rod, a shaft extending transversely of said casing and through such slot, a drum on said shaft, flexible connections from said rod to said drum for rotating said drum and shaft through movements of said rod, means operated by said shaft for indicating the weight of such article, a sleeve loosely mounted on said shaft, flexible connections from said rod to said sleeve for rotating the latter through movements of said rod, and means operated by said sleeve for indicating the weight of such article.

7. A casing, a rod movable vertically therein, having a slot and adapted to support an article to be weighed, a bar extending transversely of said casing through such slot, two weighted levers fulcrumed on said bar on opposite sides of said rod, connections from said levers to said rod and arranged to swing said levers in opposite directions by movements of said rod, a shaft extending transversely of said casing and through such slot, a sleeve loosely mounted on said shaft, flexible connections from said rod to said sleeve for rotating the latter through movements of said rod, and means operated by said sleeve for indicating the weight of such article.

In testimony that I claim the invention above set forth I affix my signature.

CHARLES F. FOGG.

Copies of this patent may be obtained for five cents each, by addressing the "Commissioner of Patents, Washington, D. C."